United States Patent
Lee et al.

(10) Patent No.: US 8,184,182 B2
(45) Date of Patent: May 22, 2012

(54) IMAGE PROCESSING APPARATUS AND METHOD

(75) Inventors: Seok Lee, Seoul (KR); Ho-cheon Wey, Seongnam-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 415 days.

(21) Appl. No.: 12/574,181

(22) Filed: Oct. 6, 2009

(65) Prior Publication Data

US 2010/0123807 A1 May 20, 2010

(30) Foreign Application Priority Data

Nov. 19, 2008 (KR) .................. 10-2008-0115212

(51) Int. Cl.
- *H04N 5/217* (2006.01)
- *H04N 5/228* (2006.01)
- *H04N 9/68* (2006.01)
- *H04N 3/14* (2006.01)
- *H04N 5/235* (2006.01)
- *G06K 9/40* (2006.01)

(52) U.S. Cl. ............. 348/241; 348/208.4; 348/234; 348/273; 348/362; 382/254

(58) Field of Classification Search .......... 348/241, 348/222.1, 208.99, 208.4, 208.7, 208.13, 348/273, 234, 236–238, 362, 229.1, 297; 382/254, 275, 279

See application file for complete search history.

(56) References Cited

U.S. PATENT DOCUMENTS

| 7,773,115 | B2* | 8/2010 | Estevez et al. | 348/208.13 |
|---|---|---|---|---|
| 2006/0187308 | A1* | 8/2006 | Lim et al. | 348/208.4 |
| 2008/0240607 | A1* | 10/2008 | Sun et al. | 382/275 |
| 2009/0167893 | A1* | 7/2009 | Susanu et al. | 348/224.1 |
| 2009/0179995 | A1* | 7/2009 | Fukumoto et al. | 348/208.6 |
| 2009/0185041 | A1* | 7/2009 | Kang et al. | 348/222.1 |

FOREIGN PATENT DOCUMENTS

| JP | 2004-194121 | 7/2008 |
|---|---|---|
| KR | 1020060135365 | 12/2006 |
| KR | 1020070102956 | 10/2007 |
| KR | 1020080000236 | 1/2008 |

OTHER PUBLICATIONS

Lu Yuan, et al., *Image Deblurring with Blurred/Noisy Image Pairs*, ACM Transaction on Graphics, vol. 26, No. 3, Article 1, Jul. 7, 2007.

* cited by examiner

*Primary Examiner* — Nhan T Tran
(74) *Attorney, Agent, or Firm* — NSIP Law

(57) ABSTRACT

An image processing apparatus and method are provided. The image processing apparatus includes a blur kernel estimator and an image restorer. The blur kernel estimator is configured to estimate a blur kernel of a first image using the first image and a second image, wherein the first image includes multi-channel color image data and the second image includes single-channel image data and is obtained with a shorter exposure time than the first image. The image restorer is configured to generate a blurred image of the second image using the blur kernel, and restore an image using residual images between images for respective channels of the first image and the blurred image of the second image, the second image, and the blur kernel.

22 Claims, 4 Drawing Sheets

IMAGE PROCESSING APPARATUS AND METHOD

CROSS-REFERENCE TO RELATED APPLICATION(S)

This application claims the benefit under 35 U.S.C. §119(a) of a Korean Patent Application No. 10-2008-115212, filed on Nov. 19, 2008, the disclosure of which is incorporated herein in its entirety by reference.

BACKGROUND

1. Field

The following description relates to an image processing apparatus and method, and more particularly, to an image processing apparatus and method for generating a clearer image using an image taken in a low-luminance environment.

2. Description of Related Art

With increase in use of digital cameras, pictures are being taken in a high-luminance environment such as outdoors as well as in a low-luminance environment such as indoors or at night. Accordingly, there is a demand for cameras able to take a clearer picture in a low-luminance environment, and camera manufacturers have been racing to develop digital cameras capable of doing the same. However, despite compensating for a photographer's inability to hold a camera steady or removing noise in a photograph, image clarity is still limited in conventional digital cameras.

SUMMARY

According to one general aspect, there is provided an image processing apparatus, including a blur kernel estimator and an image restorer. The blur kernel estimator is configured to estimate a blur kernel of a first image using the first image and a second image, wherein the first image comprises multi-channel color image data, and the second image comprises single-channel image data and is obtained with a shorter exposure time than the first image, and the image restorer is configured to generate a blurred image of the second image using the blur kernel, and restore an image using residual images between images for respective channels of the first image and the blurred image of the second image, the second image, and the blur kernel.

The first image may be an image detected from a light signal belonging to a color band of an optical region among incident light signals, and the second image may be an image detected from at least one or combination of a white signal, a white signal including infrared rays, an infrared signal, and a light signal belonging to a complementary wavelength band among the incident light signals.

The blur kernel estimator may include a channel unification processor configured to perform a channel unification, wherein the channel unification processor converts, in response to receiving a multi-channel image signal, the multi-channel image signal into a gray-scale image, generates edge images of images for respective channels corresponding to the multi-channel image signal, and synthesizes the gray-scale image with the edge images to generate a single-channel image, and the first image may be subjected to the channel unification by the channel unification processor to estimate the blur kernel.

The channel unification processor may generate the second image by performing the channel unification on a multi-channel image obtained with a shorter exposure time than the first image.

The residual images may have a smaller signal magnitude than the first image subjected to the channel unification.

The residual images may be generated by subtracting the blurred image of the second image from the images for the respective channels of the first image.

The image restorer may generate deblurred images for the residual images for the respective channels by performing deconvolution on the residual images with the blur kernel, and restore the image by adding the second image to the deblurred images.

The image restorer may perform deconvolution based on edge data extracted from the second image.

The image restorer may perform deconvolution on an image with weights assigned to respective regions of the image.

The image processing apparatus may further include an image obtainer configured to obtain the first and second images.

The second image may be an image obtained with higher sensitivity than the first image.

The second image may be of the same scene as the first image and an image obtained from optical signals of a wide-band wavelength.

The blur kernel estimator may includes a channel unification processor configured to keep edge data of the first image while the first image is subjected to channel unification, and a blur kernel extractor configured to extract the blur kernel from the channel-unified first image and the second image.

According to another aspect, there is provided an image processing method performed by an image processing apparatus, the method including obtaining a first image having multi-channel color image data, and a second image having single-channel image data obtained with a shorter exposure time than the first image, estimating a blur kernel of the first image using the first image and the second image, generating a blurred image of the second image using the blur kernel, generating residual images for respective channels of the first image between images for the respective channels and the blurred image of the second image, and restoring an image using the second image, the residual images, and the blur kernel.

The first image may be an image detected from a light signal belonging to a color band of the optical region among incident light signals, and the second image may be an image detected from at least one or combination of a white signal, a white signal including infrared rays, an infrared signal, and a light signal belonging to a complementary wavelength band among the incident light signals.

The estimating of the blur kernel may include performing channel unification on the first image, and the performing of the channel unification may include converting the first image into a gray-scale image, and generating edge images of the images for the respective channels of the first image, and generating a single-channel image by synthesizing the gray-scale image and the edge images.

The image processing method may further include generating the second image by performing the channel unification on multi-channel image data obtained with a shorter exposure time than the first image.

The generating of the residual images may include generating the residual images by subtracting the blurred image of the second image from the images for the respective channels of the first image.

The restoring of the image may include generating deblurred images of the residual images by performing deconvolution on the residual images with the blur kernel, and restoring the image by adding the second image to the deblurred images.

The restoring of the image may include performing deconvolution based on edge data extracted from the second image.

According to still another aspect, there is provided a computer-readable storage medium storing a program to process an image, including instructions to cause a computer to obtain a first image having multi-channel color image data, and a second image having single-channel image data obtained with a shorter exposure time than the first image, estimate a blur kernel of the first image using the first image and the second image, generate a blurred image of the second image using the blur kernel, generate residual images for respective channels of the first image between images for the respective channels and the blurred image of the second image, and restore an image using the second image, the residual images, and the blur kernel.

The instruction to generate the residual images may include an instruction to generate the residual images by subtracting the blurred image of the second image from the images for the respective channels of the first image.

Other features and aspects will be apparent from the following detailed description, the drawings, and the claims.

Figure 1:
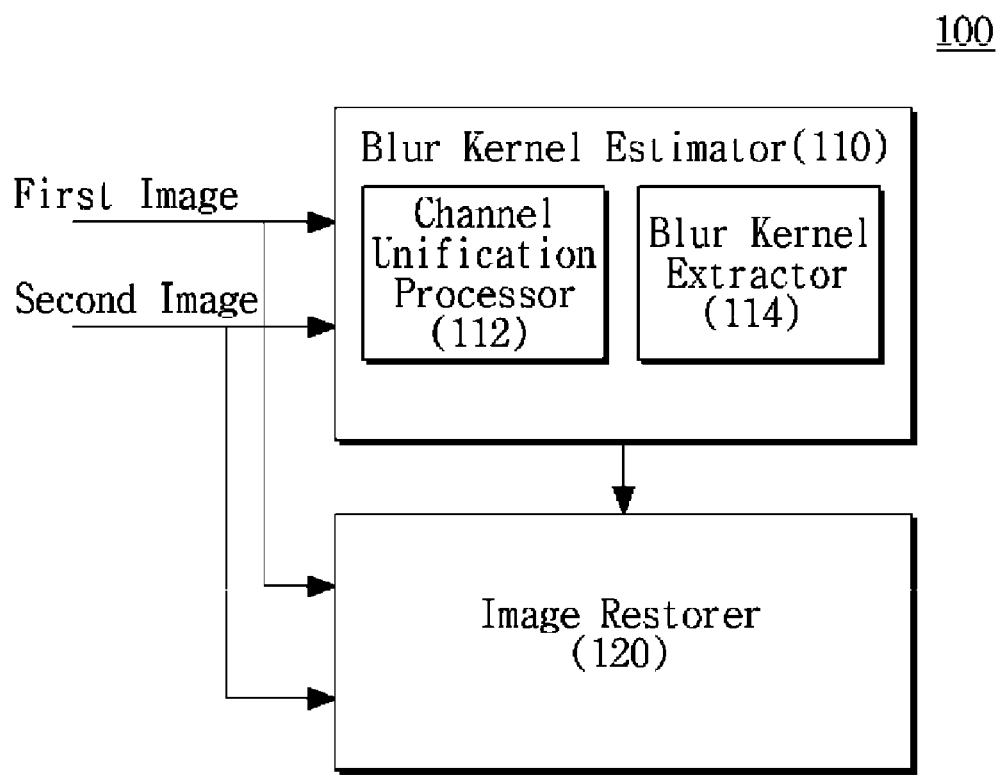
FIG. 1 is a block diagram illustrating an exemplary image processing apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 shows an exemplary image processing apparatus 100.

The image processing apparatus 100 includes a blur kernel estimator 110 and an image restorer 120. The image processing apparatus 100 restores an image that is similar in brightness and clarity as an image taken in a high-luminance environment such as outdoors or at day time, in for example, a low-luminance environment such as indoors or at night, using a first image that is a long-exposure image and a second image that is a short-exposure image, that is, using the first and second images where the second image is obtained with a shorter exposure time.

The blur kernel estimator 110 estimates a blur kernel using the first image and the second image. The first image includes multi-channel image data including color data. The second image includes single-channel image data obtained with a shorter exposure time than the first image. The second image may be obtained with higher sensitivity than the first image.

As one example, the first image may be detected from a light signal belonging to a color band of the optical region among incident light signals. The second image may be detected from at least one or combination of a white signal, a white signal including infrared rays, an infrared signal, and a light signal belonging to a complementary wavelength band among the incident light signals. The second image is of the same scene as the first image, captured with a shorter exposure time than the first image, and may be obtained from optical signals of a wide-band wavelength where the optical signals include fine contrast data and abundant texture data.

The image processing apparatus 100 may further include an image obtainer (not shown) to obtain the first image and the second image. A unit for obtaining the first image and a unit for obtaining the second image may be implemented separately or in one body in the image obtainer. The image obtainer may obtain the first image including color data of the same scene and the second image captured with a shorter exposure time than the first image, and may be implemented in various structures.

To obtain the first image and the second image, cameras having different light-receiving characteristics may be used. For example, an optical camera which detects signals of a color wavelength band may be used to obtain the first image, and a wide-band camera which selectively or jointly detects signals of the entire optical region and signals of an infrared region may be used to obtain the second image.

Referring to FIG. 1, the blur kernel estimator 110 may include a channel unification processor 112 which keeps edge data of the first image while the first image is subjected to channel unification, and a blur kernel extractor 114 which extracts a blur kernel from the channel-unified first image and the second image.

In response to an image signal for a plurality of channels being received, the channel unification processor 112 converts the image signal for the channels into a gray-scale image, and generates edge images of images for the respective channels. Then, the channel unification processor 112 may generate a single-channel image by synthesizing the gray-scale image with the edge images for the respective channels.

As shown in FIG. 1, the second image may be input to the blur kernel estimator 110 including the channel unification processor 112. However, where multi-channel image data obtained with a shorter exposure time than the first image is input to the channel unification processor 112, the second image may be generated by performing channel unification in the same way as on the first image. The generated second image may be input to the blur kernel extractor 114 and used for blur kernel extraction.

The blur kernel extractor 114 extracts a blur kernel from the channel-unified first and second images.

The first image may be expressed by the following Equation 1, and the second image may be expressed by Equation 2 below.

$$I_L = I \otimes k \qquad \text{[Equation 1]}$$

Here, $I_L$ denotes a channel-unified first image, I denotes a high-definition image, k denotes a blur kernel, that is, a point spread function (PSF) based on shaking, and $\otimes$ denotes a convolution operator.

$$I_S = I + n \qquad \text{[Equation 2]}$$

$I_S$ denotes a second image, and n denotes noise. Thus, the channel-unified first image and the second image from which noise is removed are substituted into Equation 1, and the blur kernel k may be calculated using various known or to be known methods. For example, Fourier transform may be used for the calculation.

An operation of the image restorer 120 will be described below.

In general, to restore the high-definition image I, deconvolution based on, for example, the Richardson-Lucy algorithm, and the like, is performed using the blur kernel k and the input image $I_L$. However, the image restorer 120 generates residual images for respective channels by subtracting a blurred image of a second image generated using the estimated blur kernel from images for the respective channels of a first image. The image restorer 120 performs deconvolution on the residual images for the respective channels using the estimated blur kernel, so as to generate a restored image of deblurred residual images.

When deconvolution is performed on the residual images as described above, a ringing effect caused by deconvolution may be reduced because the residual images have a smaller signal magnitude than the input image $I_L$.

Accordingly, the image restorer 120 generates a blurred image of a second image using an estimated blur kernel, and restores an image using the blur kernel and residual images between images for respective channels of a first image and the blurred image of the second image. The image restorer 120 performs deconvolution based on, for example, the Richardson-Lucy algorithm, and the like, on the residual images between the images for the respective channels of the first image and the blurred image of the second image using the estimated blur kernel, so as to generate a restored image for the residual images. Then, by adding the second image to the deblurred residual images, the high-definition image I may be restored.

The image restorer 120 may perform deconvolution based on edge data extracted from the blurred image of the second image. Ringing may increase as the number of iteration increases in an iterative method such as a Richardson-Lucy method. Also, the magnitude of ringing may increase in an edge region of an image. Accordingly, the image restorer 120 may perform deconvolution with weights assigned to respective regions of the image so that less deconvolution effect occurs in an edge region and common deconvolution is performed in a flat region.

According to example(s) described above, an image processing apparatus may obtain a high-definition color image, that is, an image may be restored which has color data of a long-exposure image taken in a low-luminance environment and detailed data of a short-exposure image, and is as bright and clear or similar in brightness and clarity as an image taken in a high-luminance environment.

Figure 2:
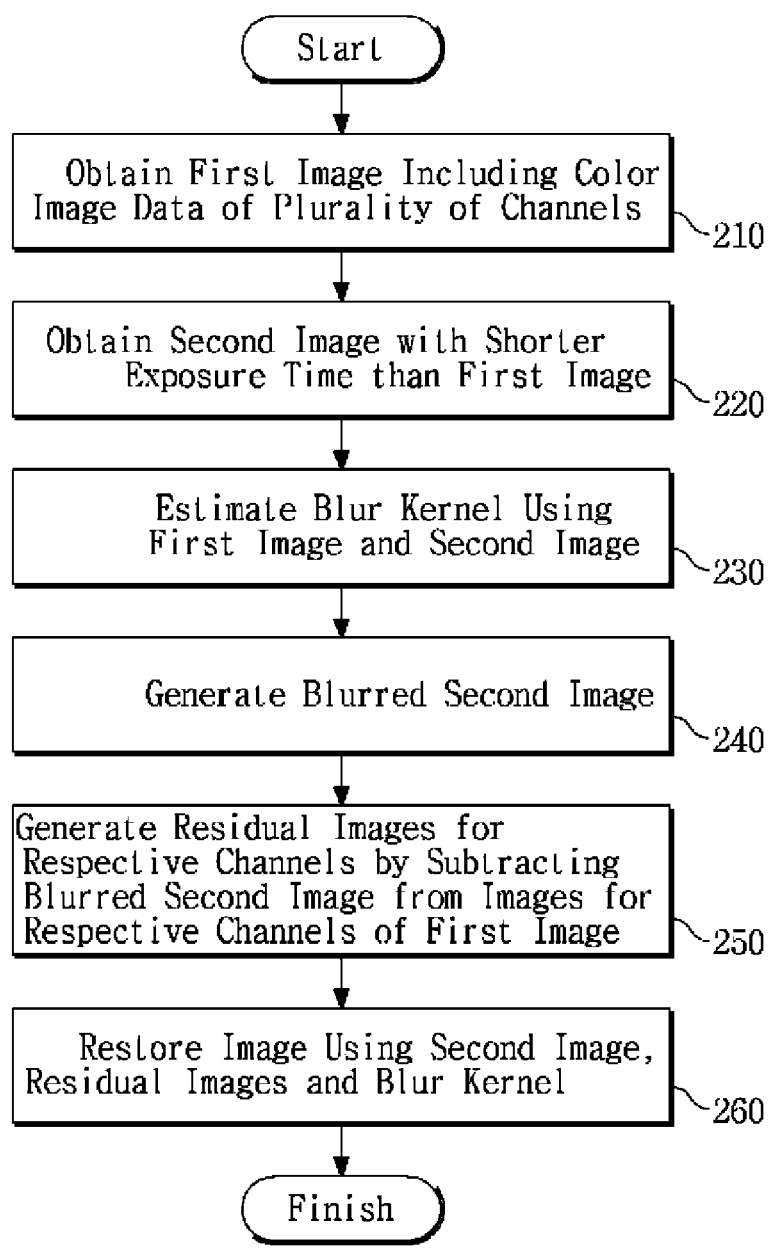
FIG. 2 is a flowchart showing an exemplary image processing method.

FIG. 2 is a flowchart showing an exemplary image processing method. The method may be performed by an image processing apparatus described above.

A first image including multi-channel color image data is obtained in operation 210. A second image including single-channel image data obtained with a shorter exposure time than the first image is obtained in operation 220. The first and second images may be obtained in any order or simultaneously.

A blur kernel of the first image is estimated using the first image and the second image in operation 230. A blurred second image is generated by applying the blur kernel to the second image in operation 240.

Residual images for respective channels are generated by subtracting the blurred second image from images for the respective channels of the first image in operation 250. An image is restored using the second image, the residual images for the respective channels and the blur kernel in operation 260.

Figure 3:
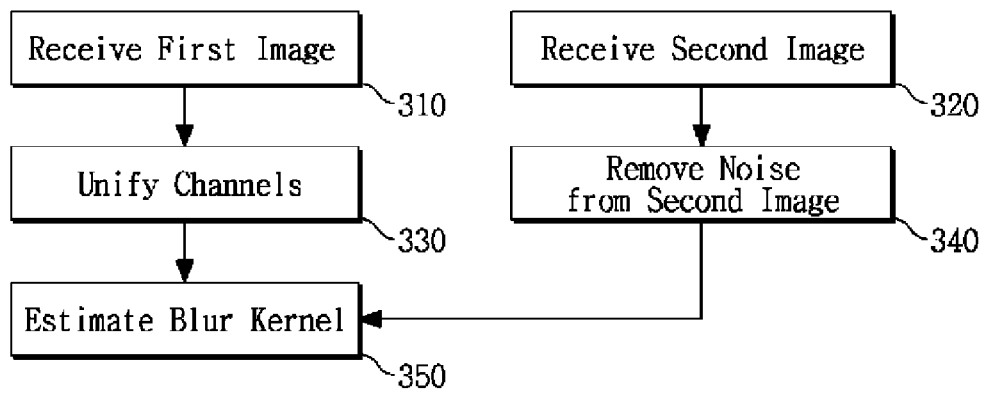
FIG. 3 is a flowchart showing an exemplary blur kernel estimation process.

FIG. 3 is a flowchart showing an exemplary blur kernel estimation process.

A first image including multi-channel color image data is received in operation 310. A second image including single-channel image data obtained with a shorter exposure time than the first image is obtained in operation 320. Channel unification is performed on the first image in operation 330. The channel unification process will be described with reference to FIG. 4.

Noise is removed from the second image which is taken with the shorter exposure time and thus has more noise in operation 340.

A blur kernel is estimated using the channel-unified first image and the second image from which noise is removed in operation 350. A blurred second image may be obtained by applying the estimated blur kernel to the second image from which noise is removed. The blurred second image is used to generate a residual image in an image restoration process.

Figure 4:
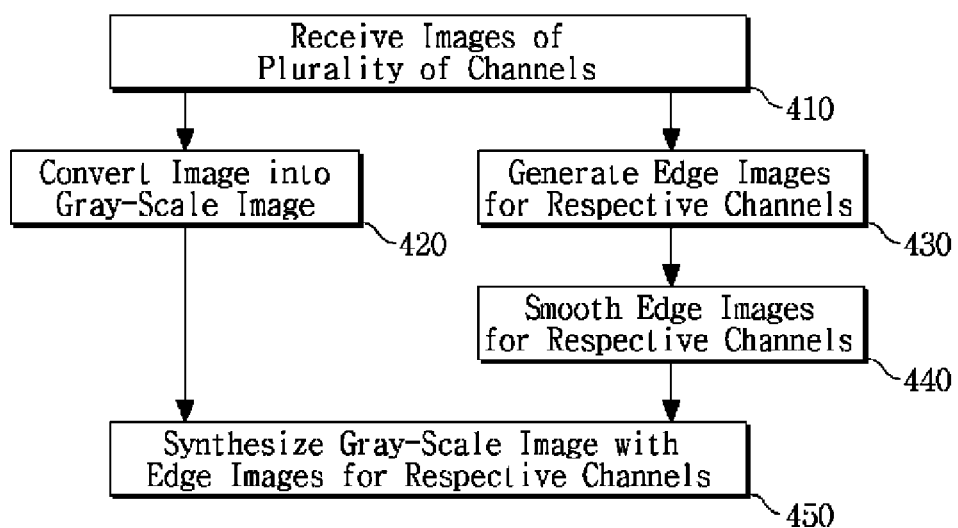
FIG. 4 is a flowchart showing an exemplary channel unification process.

FIG. 4 is a flowchart showing an exemplary channel unification process.

A first image including multi-channel color image data is received in operation 410. The first image is converted into a single-channel gray-scale image in operation 420.

In operation 430, edge images for respective channels of the first image are generated. For example, where the first image is a red-green-blue (RGB) image, edge images of an R channel, G channel and B channel are obtained. The edge images may be extracted and generated using various known or to be known methods. For example, the edge images may be extracted using known edge operators such as a homogeneity operator, a difference operator, and a compass gradient operator. In operation 440, the edge images for the respective channels are smoothed by, for example, Gaussian blurring, and the like, so as to remove noise.

In operation 450, the gray-scale image is synthesized with the smoothed edge images for the respective channels. For example, where the first image is an RGB image, the gray-scale image is synthesized with smoothed edge images of an R-channel image, G-channel image and B-channel image. As an illustration, the four images may be synthesized by averaging the images. The synthesized image may be normalized according to a data format depending on the resolution of an apparatus.

According to example(s) described above, using edge images for respective channels and a gray-scale image including detailed data of an image, for example, region-specific brightness data, a single-channel image in which the detailed data of the image and edge data for the respective channels is kept up may be generated. Thus, an accurate blur kernel may be estimated using the single-channel image.

Figure 5:
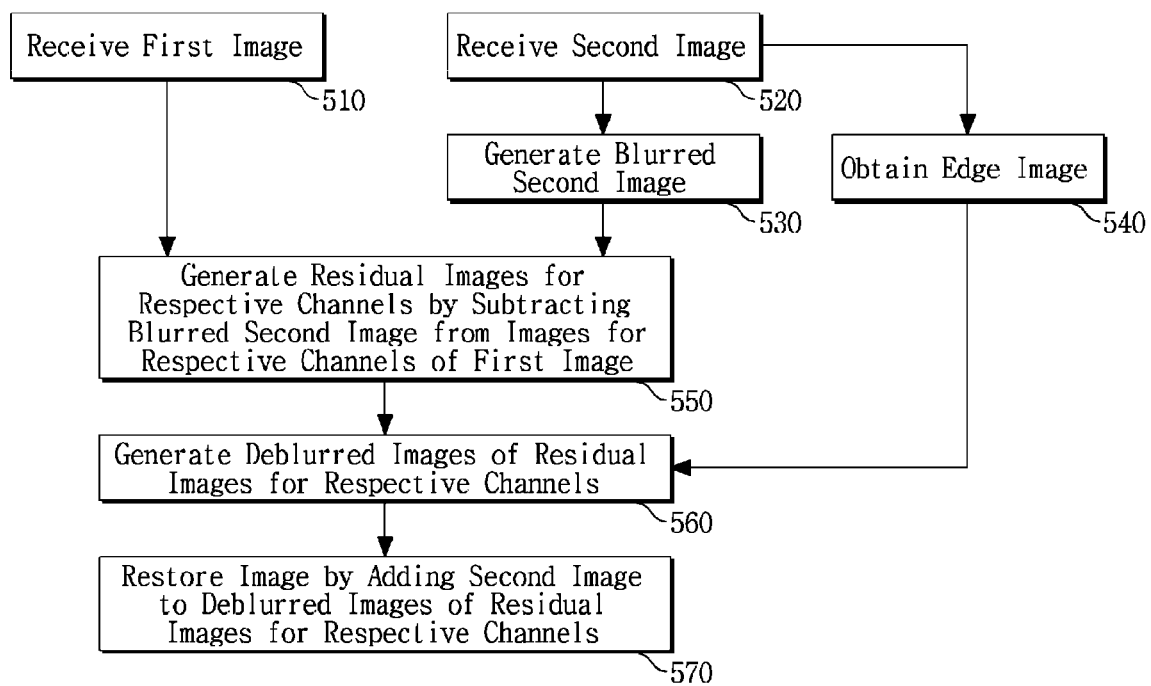
FIG. 5 is a flowchart showing an exemplary image restoration process.

FIG. 5 is a flowchart showing an exemplary image restoration process.

A first image including multi-channel color image data is received in operation 510. A second image including single-channel image data obtained with a shorter exposure time than the first image is obtained in operation 520.

A blurred second image is generated using the second image and an estimated blur kernel in operation 530. Residual images for respective channels are generated by subtracting the blurred second image from images for the respective channels of the first image in operation 550.

Deblurred images for the respective channels are generated by performing deconvolution on the respective residual images for the respective channels using the estimated blur kernel in operation 560. An edge image is obtained from the second image in operation 540, and region-specific weights may be set based on the edge image of the second image and deconvolution may be performed according to the set weights in the deconvolution operation in operation 560. Accordingly, a ringing effect occurring in the restoration result may be reduced.

Restored images are generated according to the channels by adding the obtained second image to the deblurred images of the residual images for the respective channels in operation 570.

According to example(s) described above, an image may be restored that is as bright and clear or similar in brightness and clarity as an image taken in a high-luminance environment using a longer-exposed image and shorter-exposed image taken in a low-luminance environment.

To generate a higher definition image, a first image having multi-channel color data and a second image having single-channel image data obtained with a shorter exposure time than the first image may be used. The second image may have higher sensitivity than the first image. In addition, channel unification may be performed on the first image while edge data of the first image is kept up, and the channel-unified first image may be used for blur kernel estimation. Accordingly, accuracy may be increased in blur kernel estimation.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. The computer-readable medium may be distributed among computer systems connected through a network and the computer-readable codes may be stored and executed in a decentralized manner.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing apparatus, comprising:
    a blur kernel estimator configured to estimate a blur kernel of a first image using the first image and a second image, wherein
        the first image comprises multi-channel color image data, and
        the second image comprises single-channel image data and is obtained with a shorter exposure time than the first image; and
    an image restorer configured to generate a blurred image of the second image using the blur kernel, and restore an image using residual images between images for respective channels of the first image and the blurred image of the second image, the second image, and the blur kernel.

2. The image processing apparatus of claim 1, wherein:
    the first image is an image detected from a light signal belonging to a color band of an optical region among incident light signals, and
    the second image is an image detected from at least one or combination of a white signal, a white signal including infrared rays, an infrared signal, and a light signal belonging to a complementary wavelength band among the incident light signals.

3. The image processing apparatus of claim 1, wherein:
    the blur kernel estimator comprises a channel unification processor configured to perform a channel unification, wherein the channel unification processor converts, in response to receiving a multi-channel image signal, the multi-channel image signal into a gray-scale image, generates edge images of images for respective channels corresponding to the multi-channel image signal, and synthesizes the gray-scale image with the edge images to generate a single-channel image, and
    the first image is subjected to the channel unification by the channel unification processor to estimate the blur kernel.

4. The image processing apparatus of claim 3, wherein the channel unification processor generates the second image by performing the channel unification on a multi-channel image obtained with a shorter exposure time than the first image.

5. The image processing apparatus of claim 3, wherein the residual images have a smaller signal magnitude than the first image subjected to the channel unification.

6. The image processing apparatus of claim 1, wherein the residual images are generated by subtracting the blurred image of the second image from the images for the respective channels of the first image.

7. The image processing apparatus of claim 6, wherein the image restorer generates deblurred images for the residual images for the respective channels by performing deconvolution on the residual images with the blur kernel, and restores the image by adding the second image to the deblurred images.

8. The image processing apparatus of claim 7, wherein the image restorer performs deconvolution based on edge data extracted from the second image.

9. The image processing apparatus of claim 8, wherein the image restorer performs deconvolution on an image with weights assigned to respective regions of the image.

10. The image processing apparatus of claim 1, further comprising an image obtainer configured to obtain the first and second images.

11. The image processing apparatus of claim 1, wherein the second image is an image obtained with higher sensitivity than the first image.

12. The image processing apparatus of claim 1, wherein the second image is of the same scene as the first image and is an image obtained from optical signals of a wide-band wavelength.

13. The image processing apparatus of claim 1, wherein the blur kernel estimator comprises:
    a channel unification processor configured to keep edge data of the first image while the first image is subjected to channel unification; and a blur kernel extractor configured to extract the blur kernel from the channel-unified first image and the second image.

14. An image processing method performed by an image processing apparatus, the method comprising:
obtaining a first image having multi-channel color image data, and a second image having single-channel image data obtained with a shorter exposure time than the first image;
estimating a blur kernel of the first image using the first image and the second image;
generating a blurred image of the second image using the blur kernel;
generating residual images for respective channels of the first image between images for the respective channels and the blurred image of the second image; and
restoring an image using the second image, the residual images, and the blur kernel.

15. The image processing method of claim 14, wherein:
the first image is an image detected from a light signal belonging to a color band of the optical region among incident light signals, and
the second image is an image detected from at least one or combination of a white signal, a white signal including infrared rays, an infrared signal, and a light signal belonging to a complementary wavelength band among the incident light signals.

16. The image processing method of claim 14, wherein:
the estimating of the blur kernel comprises performing channel unification on the first image, and
the performing of the channel unification comprises:
converting the first image into a gray-scale image, and generating edge images of the images for the respective channels of the first image; and
generating a single-channel image by synthesizing the gray-scale image and the edge images.

17. The image processing method of claim 16, further comprising generating the second image by performing the channel unification on multi-channel image data obtained with a shorter exposure time than the first image.

18. The image processing method of claim 14, wherein the generating of the residual images comprises generating the residual images by subtracting the blurred image of the second image from the images for the respective channels of the first image.

19. The image processing method of claim 18, wherein the restoring of the image comprises:
generating deblurred images of the residual images by performing deconvolution on the residual images with the blur kernel; and
restoring the image by adding the second image to the deblurred images.

20. The image processing method of claim 19, wherein the restoring of the image comprises performing deconvolution based on edge data extracted from the second image.

21. A non-transitory computer-readable storage medium storing a program to process an image, comprising instructions to cause a computer to:
obtain a first image having multi-channel color image data, and a second image having single-channel image data obtained with a shorter exposure time than the first image;
estimate a blur kernel of the first image using the first image and the second image;
generate a blurred image of the second image using the blur kernel;
generate residual images for respective channels of the first image between images for the respective channels and the blurred image of the second image; and
restore an image using the second image, the residual images, and the blur kernel.

22. The computer-readable storage medium of claim 21, wherein the instruction to generate the residual images comprises an instruction to generate the residual images by subtracting the blurred image of the second image from the images for the respective channels of the first image.

* * * * *